United States Patent
Xi et al.

(10) Patent No.: US 9,042,890 B2
(45) Date of Patent: May 26, 2015

(54) METHOD, SYSTEM AND ACCESS DEVICE FOR CONTROLLING ACCESS OF TERMINAL

(75) Inventors: Jin Xi, Guangdong Province (CN); Hengxing Zhai, Guangdong Province (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 152 days.

(21) Appl. No.: 13/258,511

(22) PCT Filed: Jan. 20, 2011

(86) PCT No.: PCT/CN2011/070438
§ 371 (c)(1),
(2), (4) Date: Apr. 11, 2013

(87) PCT Pub. No.: WO2012/041024
PCT Pub. Date: Apr. 5, 2012

(65) Prior Publication Data
US 2013/0189984 A1 Jul. 25, 2013

(30) Foreign Application Priority Data
Sep. 29, 2010 (CN) .......................... 2010 1 0500623

(51) Int. Cl.
*H04W 36/00* (2009.01)
*H04W 48/08* (2009.01)
*H04W 8/18* (2009.01)

(52) U.S. Cl.
CPC .......... *H04W 36/0077* (2013.01); *H04W 8/186* (2013.01); *H04W 48/08* (2013.01)

(58) Field of Classification Search
None
See application file for complete search history.

(56) References Cited

U.S. PATENT DOCUMENTS

| 8,600,387 B2 * | 12/2013 | Horn ............................ 455/436 |
| 2010/0279687 A1 * | 11/2010 | Horn et al. ................. 455/435.1 |

FOREIGN PATENT DOCUMENTS

| CN | 101600157 A | 12/2009 |
| CN | 101600237 A | 12/2009 |
| CN | 101646253 A | 2/2010 |
| CN | 101772099 A | 7/2010 |
| CN | 101784086 A | 7/2010 |
| CN | 101790221 A | 7/2010 |
| CN | 101847874 A | 9/2010 |
| CN | 101873627 A | 10/2010 |

OTHER PUBLICATIONS

International Search Report mailed Jul. 7, 2011, for PCT/CN2011/070438.

* cited by examiner

*Primary Examiner* — Erika A Washington
(74) *Attorney, Agent, or Firm* — Banner & Witcoff, Ltd.

(57) ABSTRACT

The present invention discloses a method for access control of a terminal, which is applied to the access control of the terminal in a terminal handover process. The method comprises: a source access network element notifying a target access network element of closed subscriber group configuration information of a source cell via a direct interface, and the target access network element determining whether to allow the terminal to access to a target cell based on closed subscriber group configuration information of the target cell and the closed subscriber group configuration information of the source cell. The present invention further discloses a method for access control of a terminal and an access equipment. The present invention provides a feasible scheme for the access control process when the terminal performs handover via a direct interface.

15 Claims, 1 Drawing Sheet

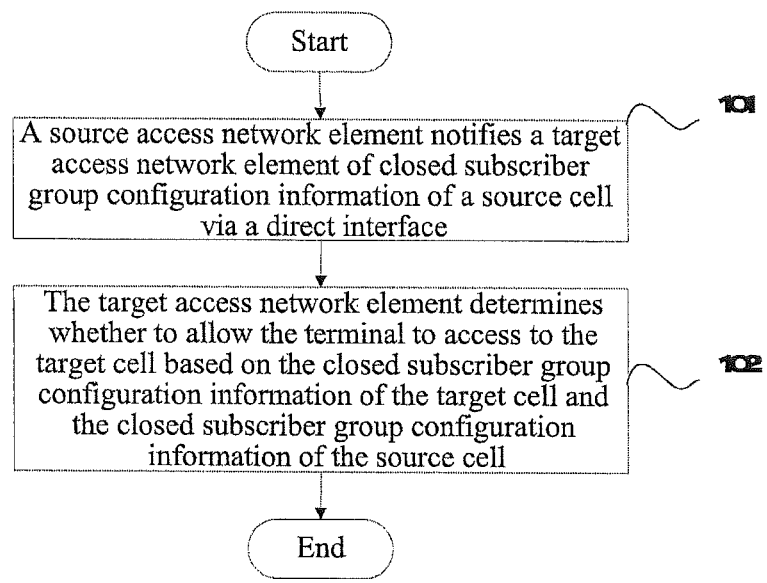

METHOD, SYSTEM AND ACCESS DEVICE FOR CONTROLLING ACCESS OF TERMINAL

TECHNICAL FIELD

The present invention relates to the wireless communication field, and more particularly, to a method and a system for access control of a terminal, and an access equipment.

BACKGROUND OF THE RELATED ART

Home NodeB, which is one type of NodeB or evolved NodeB (eNodeB), i.e., a small low power NodeB, is deployed in private places such as homes, groups, companies or schools as the exclusive resources of private users. A main role of the home NodeB is to provide higher service rate for users, reduce expense required to use high-speed services and to make up for the deficiencies of coverage of the existing distributed cellular wireless communication system. Advantages of the home NodeB include veritable boon, conveniency, low power output, and plug and play.

Users of the home NodeB are connected to a core network via a Home NodeB Access Network (HNB AN for short), which consists of a Home NodeB (HNB for short) and a Home NodeB Gateway (HNB GW for short). Functions performed mainly by the home NodeB gateway include verifying security of the home NodeB, dealing with registration and access control of the home NodeB, performing operation, maintenance and management of the home NodeB, configuring and controlling the home NodeB according to requirements of operators, and being in charge of exchanging data between the core network and the home NodeB.

In the Universal Mobile Telecommunications System (UMTS for short), the home NodeB must access to the core network via the home NodeB gateway. An interface between the home NodeB and the home NodeB gateway is an Iuh interface, and an interface between the home NodeB gateway and the core network is an Iu interface.

In the Long Term Evolution (LTE for short) system, a home evolved NodeB (HeNB) may be connected to the core network directly without through the home NodeB gateway. If the home NodeB gateway exists, interfaces both between the home NodeB and the home NodeB gateway and between the home NodeB gateway and the core network are S1 interfaces. Protocol stack of the S1 interface is divided into a control plane and a user plane.

Home NodeBs in the LTE and UMTS systems access to a H(e)NB Management System (HMS for short), which is in charge of the management and configuration of the home NodeB, based on the TR-069 protocol stack.

A plurality of cells covered by the home NodeB constitutes a coverage area of the home NodeB. Access modes of the home NodeB include a closed access mode, hybrid access mode and open access mode. A home NodeB with the closed access mode only allows access of authorized users, such as family members and group members. A home NodeB with the hybrid access mode allows access of all users, but the authorized users of the home NodeB enjoy priority or preferential conditions. A home NodeB with the open access mode allows access of all users.

The Closed Subscriber Group (CSG for short) cell has not only a Cell Global Identifier (CGI) but also a CSG cell identifier (CSG ID). CSG cells possessing different cell global identifiers may correspond to the same CSG ID. A home NodeB gateway or a core network element connected to the home NodeB may acquire, at an initialization stage of the home NodeB, the CSG ID and the access mode of the home NodeB, as well as the cell global identifier of the cell in which the home NodeB is set up. A non-home NodeB is generally referred to as a NodeB or macro NodeB, and its cell is referred to as a macro cell. With the constant promotion of discussion of the technology, the CSG concept is applied to not only the home NodeB but also the macro NodeB so as to perform access control for the users.

To implement access control required for the aforementioned three different access modes, standard organizations introduced the CSG concept. Since a user joins a specific CSG and the cell in which the home NodeB is set up is endowed with logic CSG attributes (including the CSG ID), the core network, the home NodeB and the home NodeB gateway collectively complete control of the access user. When a user equipment (UE for short) wants to reside in a CSG cell with the closed or hybrid mode, the home NodeB reports the CSG ID of the cell and the access mode to the network side, which checks whether the UE is a member of the CSG based on communication context and subscription data of the UE. For a CSG cell with the closed mode, only access of an authorized user is allowed (the UE becomes an authorized user as soon as it becomes a member of the CSG), and access of the unauthorized users is prohibited. For a CSG cell with the hybrid mode, the network side will allow access of an applying user, while notifying the home NodeB of information as to whether the user is a member of the CSG. The home NodeB will perform admission and management of priority or preference for the member. A home NodeB with the open mode behaves like a common macro NodeB and can perform direct access rather than CSG-based access control.

There are two approaches for a UE to enter a cell, one is to directly access to a target cell, and the other is to switch to a target cell from other cells through a handover mode. In the handover process of the UE, signaling interaction may be performed via an interface between a Radio Network Controllers (RNC)/NodeB and a core network or via a direct interface between RNCs or between NodeBs. However, when the UE performs handover via a direct interface between a source access network element and a target access network element, there is no implementation method for access control in the existing technology.

CONTENT OF THE INVENTION

A technical problem to be solved by the present invention is to provide a method and a system for access control of a terminal and an access equipment so as to provide a feasible scheme for the access control process when the terminal performs handover via a direct interface.

In order to solve the aforementioned technical problem, the present invention provides a method for access control of a terminal, which is applied to the access control of the terminal in a terminal handover process, the method comprising:

a source access network element notifying a target access network element of closed subscriber group configuration information of a source cell via a direct interface, and the target access network element determining whether to allow the terminal to access to a target cell based on closed subscriber group configuration information of the target cell and the closed subscriber group configuration information of the source cell.

The closed subscriber group configuration information includes a closed subscriber group identifier and a closed subscriber group access mode.

The method further comprises:
in the case that the access mode of the source cell is a hybrid access mode, when the source access network element sends a handover request to the target access network element, notifying the target access network element of information as to whether the terminal is a member of the closed subscriber group in the source cell via a direct interface handover process.

In the step of the target access network element determining whether to allow the terminal to access to the target cell, when the access mode of the target cell is a closed access mode, the target access network element allows access of the terminal in the following cases: the source cell is a closed access mode closed subscriber group cell with the same closed subscriber group cell identifier as the target cell; or, the source cell is a hybrid access mode closed subscriber group cell with the same closed subscriber group cell identifier as the target cell and the terminal is a member of the closed subscriber group in the source cell;

when the target cell is a hybrid access mode closed subscriber group cell, the target access network element allows access of the terminal, and determines membership status of the terminal in the target cell according to the following conditions: the source cell is a closed access mode closed subscriber group cell with the same closed subscriber group identifier as the target cell, and the target access network element accesses to the terminal as a member of the closed subscriber group; or, the source cell is a hybrid closed subscriber group cell with the same closed subscriber group identifier as the target cell, and the membership status of the terminal in the target cell is the same as that in the source cell; or, the source cell is an open access mode cell, or a common macro cell, or a closed access mode closed subscriber group cell with another closed subscriber group identifier, or a hybrid access mode closed subscriber group cell, and the terminal accesses to the target access network as a non-member of the closed subscriber group;

when the target cell is an open access mode cell or a common macro cell, the target access network element allows access of the terminal.

The step of the source access network element notifying the target access network element of the closed subscriber group configuration information of the source cell via the direct interface comprises:
before the source access network element sets up the direct interface with the target access network element, the source access network element and the target access network element acquiring the closed subscriber group configuration information of the cell of the other side based on static configuration information of an operation, maintenance and management network element; or, when the source access network element and the target access network element acquire direct interface information of the opponent, performing interaction of the closed subscriber group configuration information via a direct interface transmission address searching process.

The step of the source access network element notifying the target access network element of the closed subscriber group configuration information of the source cell via the direct interface comprises:
the source access network element sending the closed subscriber group configuration information of the source cell to the target access network element via a direct interface set up process.

The step of the source access network element notifying the target access network element of the closed subscriber group configuration information of the source cell via the direct interface comprises:
the source access network element updating the closed subscriber group configuration information of the source cell to the target access network element via a NodeB configuration update process.

In a long term evolution system, the source access network element and the target access network element refer to emacro NodeBs, or home eNodeBs or access nodes having eNodeB functions; in a universal mobile telecommunication system, the source access network element and the target access network element refer to radio network controllers, or macro NodeBs, or home NodeBs, or access nodes having NodeB functions.

In order to solve the aforementioned problem, the present invention also provides a system for access control of a terminal, which is applied to the access control of the terminal in a terminal handover process, the system comprising a source access network element to which the terminal belongs, and a target access network element to which the terminal switches, wherein
the source access network element is configured to notify the target access network element of closed subscriber group configuration information of a source cell via a direct interface;
the target access network element is configured to determine whether to allow the terminal to access to a target cell based on closed subscriber group configuration information of the target cell and the closed subscriber group configuration information of the source cell.

The source access network element is configured to notify the target access network element of the closed subscriber group configuration information of the source cell via the direct interface by:
before the source access network element sets up the direct interface with the target access network element, performing interaction of the closed subscriber group configuration information with the target access network element via static configuration information of an operation, maintenance and management network element; or
when the source access network element and the target access network element acquire direct interface information of the opponent, performing interaction of the closed subscriber group configuration information with the target access network element via a direct interface transmission address searching process; or
sending the closed subscriber group configuration information of the source cell to the target access network element via a direct interface set up process; or
updating the closed subscriber group configuration information of the source cell to the target access network element via a NodeB configuration update process.

In order to solve the aforementioned problem, the present invention also provides an access equipment applied to access control of a terminal in a terminal handover process, the access equipment being configured to,
when the access equipment is a source access network element, notify a target access network element of closed subscriber group configuration information of a source cell via a direct interface, and
when the access equipment is the target access network element, determine whether to allow the terminal to access to a target cell based on closed subscriber group configuration information of the target cell and the closed subscriber group configuration information of the source cell.

The closed subscriber group configuration information includes a closed subscriber group identifier and a closed subscriber group access mode.

When the access equipment is the source access network element, the access equipment is further configured to, in the case that the access mode of the source cell is a hybrid access mode, when a handover request is sent to the target access network element, notify the target access network element of information as to whether the terminal is a member of the closed subscriber group in the source cell via a direct interface handover process.

The closed subscriber group configuration information includes a closed subscriber group identifier and a closed subscriber group access mode.

When the access equipment is the target access network element, the access equipment is configured to determine whether to allow the terminal to access to the target cell according to the following approaches:

when the access mode of the target cell is a closed access mode, the target access network element allows access of the terminal in the following cases: the source cell is a closed access mode closed subscriber group cell with the same closed subscriber group cell identifier as the target cell; or, the source cell is a hybrid access mode closed subscriber group cell with the same closed subscriber group cell identifier as the target cell and the terminal is a member of the closed subscriber group in the source cell;

when the target cell is a hybrid access mode closed subscriber group cell, the target access network element allows access of the terminal, and determines membership status of the terminal in the target cell according to the following conditions: the source cell is a closed access mode closed subscriber group cell with the same closed subscriber group identifier as the target cell, and the target access network element accesses to the terminal as a member of the closed subscriber group; or, the source cell is a hybrid closed subscriber group cell with the same closed subscriber group identifier as the target cell, and the membership status of the terminal in the target cell is the same as that in the source cell; or, the source cell is an open access mode cell, or a common macro cell, or a closed access mode closed subscriber group cell with another closed subscriber group identifier, or a hybrid access mode closed subscriber group cell, and the terminal accesses to the target access network as a non-member of the closed subscriber group;

when the target cell is an open access mode cell or a common macro cell, the target access network element allows access of the terminal.

The closed subscriber group configuration information includes a closed subscriber group identifier and a closed subscriber group access mode.

When the access equipment is the source access network element, the access equipment is configured to notify the target access network element of the closed subscriber group configuration information of the source cell via the direct interface according to the following approaches:

before the source access network element sets up the direct interface with the target access network element, the source access network element and the target access network element acquire the closed subscriber group configuration information of the cell of the other side based on static configuration information of an operation, maintenance and management network element; or, when the source access network element and the target access network element acquire direct interface information of the opponent, interaction of the closed subscriber group configuration information is performed via a direct interface transmission address searching process; or the source access network element sends the closed subscriber group configuration information of the source cell to the target access network element via a direct interface set up process; or the source access network element updates the closed subscriber group configuration information of the source cell to the target access network element via a NodeB configuration update process.

In a long term evolution system, the access equipment is a macro eNodeB, or home eNodeB or access node having eNodeB functions; in a universal mobile telecommunication system, the access equipment is a radio network controller, or macro NodeB, or home NodeB, or access node having NodeB functions.

The present invention provides a feasible scheme for the access control process when the terminal performs handover via the direct interface.

BRIEF DESCRIPTION OF DRAWINGS

FIG. 1 is a flow chart of a method for access control of a terminal in a terminal handover process in accordance with an embodiment of the present invention.

PREFERRED EMBODIMENTS OF THE PRESENT INVENTION

Embodiments of the present invention will be described in detail in conjunction with the accompanying FIGURES. It should be noted that, in the case of no conflict, the embodiments and the features in the embodiments in the application may be combined arbitrarily.

An embodiment provides a system for access control of a terminal in a terminal handover process comprising a source access network element to which the terminal belongs and a target access network element to which the terminal switches.

The source access network element is configured to notify the target access network element of closed subscriber group configuration information of a source cell via a direct interface.

The target access network element is configured to determine whether to allow the terminal to access to a target cell based on closed subscriber group configuration information of the target cell and the closed subscriber group configuration information of the source cell.

The source access network element may notify the target access network element of the closed subscriber group configuration information of the source cell by at least one of:

before the source access network element sets up the direct interface with the target access network element, performing interaction of the closed subscriber group configuration information with the target access network element via static configuration information of an operation, maintenance and management network element;

when the source access network element and the target access network element acquire direct interface information of the opponent, performing interaction of the closed subscriber group configuration information with the target access network element via a direct interface transmission address searching process;

sending the closed subscriber group configuration information of the source cell to the target access network element via a direct interface set up process;

updating the closed subscriber group configuration information of the source cell to the target access network element via a NodeB configuration update process.

In the LTE system, the source access network element and the target access network element refer to macro NodeBs, or home NodeBs or access nodes having NodeB functions; in the UMTS system, the source access network element and the target access network element refer to radio network controllers, or macro NodeBs, or home NodeBs, or access nodes having NodeB functions (such as relay nodes). If the access network elements are home NodeBs, they optionally are connected to a core network via a home NodeB gateway (HeNB GW or HNB GW). If the access network elements are relay nodes, they are required to be connected to the core network via a donor evolved NodeB (DeNB). Different access network elements have corresponding background management systems (OAM or HMS).

As shown in FIG. 1, a method for access control of a terminal in a terminal handover process comprises:

Step 101: a source access network element notifies a target access network element of closed subscriber group configuration information of a source cell via a direct interface.

The closed subscriber group configuration information comprises a closed subscriber group identifier and a closed subscriber group access mode.

The approach for the source access network element to notify the target access network element of the closed subscriber group configuration information of the source cell may be one of the following approaches:

1. Before the source access network element sets up the direct interface with the target access network element, the source access network element and the target access network element acquire the closed subscriber group configuration information of the cell of the other side based on static configuration information of an operation, maintenance and management network element.

Specifically, after being initially powered up, the access network elements acquire configuration parameters, including the configured CSG information of the cells, required for a NodeB from the static configuration information of the operation, maintenance and management network element of the background. The access network elements enter into the operating state, and set up a cell X based on the configuration parameters, and broadcast the cell parameters, including the configured CSG information, via an air interface. The access network elements acquire information required to set up a direct interface with the opponent from the static configuration information of the operation, maintenance and management network element. The static configuration information also contains transmission layer connection address and port information of the opponent end of the direct interface or the CSG information of the opponent end.

2. When the source access network element and the target access network element acquire direct interface information of the opponent, interaction of the closed subscriber group configuration information is performed via a direct interface transmission address searching process (for example, the process is included in an eNB configuration transfer or MME configuration transfer process of the LTE system).

Specifically, the source access network element sends a direct interface information request (e.g., eNB/MME configuration transfer), which contains the transmission layer address and port information of the direct interface used by the source access network element or the CSG information of the source cell, to the target access network element via the core network. The target access network element responds to the request (e.g., eNB/MME configuration transfer), and the response contains the transmission layer address and port information of the direct interface used by the target access network element or the CSG information of the target cell.

Before the source access network element sets up the direct interface with the target access network element, they need to acquire the CSG configuration information of the opponent so as to determine whether the direct interface is required to be set up such that the operation of notifying the closed subscriber group configuration information can be completed through the interaction process in the first and second approaches described above. The resource access network element and the target access network element determine that the direct interface is required to be set up when the CSG configuration information of the source cell and the target cell is same or the cell of the other side is an open access mode cell or common macro cell.

3. The source access network element sends the closed subscriber group configuration information of the source cell to the target access network element (generally in the case that the interaction of the CSG configuration information is not performed in the processes illustrated in the first and second approaches) via a direct interface set up process (e.g., an X2 interface set up process comprised of an X2 Setup Request and an X2 Setup Response in the LTE system).

4. The source access network element updates the closed subscriber group configuration information of the source cell to the target access network element via a NodeB configuration update process.

Specifically, after the source access network element sets up the direct interface with the target access network element, in the case that the interaction of the closed subscriber group configuration information has not yet performed between both network elements or the closed subscriber group configuration information changes, the source access network element notifies the target access network element of the closed subscriber group configuration information of the source cell via the NodeB configuration update process (e.g., an eNB configuration update process in the LTE system).

To sum up, interaction of CSG configuration of two access nodes may be performed between the two nodes in the direct interface parameter configuration (static/dynamic) stage, the direct interface setup stage or the direct interface maintenance and update stage. If the direct interface between the two nodes performs proxy via a proxy node (e.g., home NodeB gateway or DeNB), the proxy node may respond to the process as a principal node and notifies A or B of the CSG configuration of the opponent.

In addition, after the source access network element sets up the direct interface with the target access network element, when the source access network element determines that a UE is required to be switched to the target access network element, it sends a direct interface handover process (such as an X2 handover process in the LTE system) to the target access network element. Moreover, when the access mode of the source cell is a hybrid access mode and the source access network element sends a handover request to the target access network element, the source access network element notifies the target access network element of information as to whether the terminal is a member of the closed subscriber group in the source cell via the direct interface handover process.

Step 102: the target access network element determines whether to allow the terminal to access to the target cell based on the closed subscriber group configuration information of the target cell and the closed subscriber group configuration information of the source cell.

when the access mode of the target cell is a closed access mode, the target access network element allows access of the terminal in the following cases:

The source cell is a closed access mode closed subscriber group cell with the same closed subscriber group cell identifier as the target cell; or, the source cell is a hybrid access mode closed subscriber group cell with the same closed subscriber group cell identifier as the target cell and the terminal is a member of the closed subscriber group in the source cell.

When the target cell is a hybrid access mode closed subscriber group cell, the target access network element allows access of the terminal, and determines membership status of the terminal in the target cell according to the following conditions:

the source cell is a closed access mode closed subscriber group cell with the same closed subscriber group identifier as the target cell, and the target access network element accesses to the terminal as a member of the closed subscriber group;

the source cell is a hybrid closed subscriber group cell with the same closed subscriber group identifier as the target cell, and the membership status of the terminal in the target cell is the same as that in the source cell;

the source cell is an open access mode cell, or a common macro cell, or a closed access mode closed subscriber group cell with another closed subscriber group identifier, or a hybrid access mode closed subscriber group cell, and the terminal accesses to the target access network as a non-member of the closed subscriber group;

when the target cell is an open access mode cell or a common macro cell, access of the terminal is allowed.

In this method, after the UE accesses to the target access network element successfully, the target access network element sends necessary context update of the UE, such as a user plane address and new CSG information of the UE (a CSG identifier and the access mode of the accessed cell, and information as to whether the UE has CSG membership status in the target cell), to the core network.

The present invention provides a feasible scheme for the access control process when the terminal performs handover via the direct interface, and also provides a method for entering into a CSG cell with a closed access mode or hybrid access mode via the direct interface handover process. The method supports access of the subscribed UE to the closed CSG cell, and enables the target eNB to determine accurately the membership status of the access UE when the hybrid CSG cell is accessed.

The present invention also provides an access equipment applied to access control of a terminal in a terminal handover process. The access equipment is configured to, when the access equipment is a source access network element, notify a target access network element of closed subscriber group configuration information of the source cell via a direct interface, and when the access equipment is the target access network element, determine whether to allow the terminal to access to a target cell based on closed subscriber group configuration information of the target cell and the closed subscriber group configuration information of the source cell.

The closed subscriber group configuration information includes a closed subscriber group identifier and a closed subscriber group access mode.

When the access equipment is the source access network element, the access equipment is further configured to, in the case that the access mode of the source cell is a hybrid access mode, when a handover request is sent to the target access network element, notify the target access network element of information as to whether the terminal is a member of the closed subscriber group in the source cell via a direct interface handover process.

When the access equipment is the target access network element, the access equipment is configured to determine whether to allow the terminal to access to the target cell according to the following approaches:

when the access mode of the target cell is a closed access mode, the target access network element allows access of the terminal in the following cases: the source cell is a closed access mode closed subscriber group cell with the same closed subscriber group cell identifier as the target cell; or, the source cell is a hybrid access mode closed subscriber group cell with the same closed subscriber group cell identifier as the target cell and the terminal is a member of the closed subscriber group in the source cell;

when the target cell is a hybrid access mode closed subscriber group cell, the target access network element allows access of the terminal, and determine membership status of the terminal in the target cell according to the following conditions: the source cell is a closed access mode closed subscriber group cell with the same closed subscriber group identifier as the target cell, and the target access network element accesses to the terminal as a member of the closed subscriber group; or, the source cell is a hybrid closed subscriber group cell with the same closed subscriber group identifier as the target cell, and the membership status of the terminal in the target cell is the same as that in the source cell; or, the source cell is an open access mode cell, or a common macro cell, or a closed access mode closed subscriber group cell with another closed subscriber group identifier, or a hybrid access mode closed subscriber group cell, and the terminal accesses to the target access network as a non-member of the closed subscriber group;

when the target cell is an open access mode cell or a common macro cell, the target access network element allows access of the terminal.

When the access equipment is the source access network element, the access equipment is configured to notify the target access network element of the closed subscriber group configuration information of the source cell via the direct interface according to the following approaches:

before the source access network element sets up the direct interface with the target access network element, the source access network element and the target access network element acquire the closed subscriber group configuration information of the cell of the other side based on static configuration information of an operation, maintenance and management network element; or, when the source access network element and the target access network element acquire direct interface information of the opponent, interaction of the closed subscriber group configuration information is performed via a direct interface transmission address searching process; or the source access network element sends the closed subscriber group configuration information of the source cell to the target access network element via a direct interface set up process; or the source access network element updates the closed subscriber group configuration information of the source cell to the target access network element via a NodeB configuration update process.

In the long term evolution system, the access equipment is a macro eNodeBs, or home eNodeBs or access nodes having eNodeB functions; in the universal mobile telecommunication system, the access equipment is a radio network controller, or macro NodeB, or home NodeB, or access node having NodeB functions.

Of course, the present invention may have other different embodiments, and various corresponding modifications and variations to the present invention may be made by those skilled in the art without departing from the spirit and essence of the present invention. However, all these corresponding modifications and variations should be covered in the protection scope of the appended claims of the present invention.

It may be understood by those skilled in the art that some or all steps in the foregoing method may be performed by instructing the relevant hardware with programs stored in a computer readable storage medium, such as read only memory, magnetic disk or optical disk. Optionally, some or all steps in the abovementioned embodiments may be implemented using one or more integrated circuits. Accordingly, each module/unit in the abovementioned embodiments may be implemented in a form of hardware or in a form of software function module. The present invention is not limited to combinations of hardware and software in any particular form.

INDUSTRIAL APPLICABILITY

The present invention provides a feasible scheme for the access control process when the terminal performs handover via the direct interface, and also provides a method for entering into a CSG cell with a closed access mode or hybrid access mode via the direct interface handover process. The method supports access of the subscribed UE to the closed CSG cell, and enables the target eNB to determine accurately the membership status of the access UE when the hybrid CSG cell is accessed.

What is claimed is:

1. A method for access control of a terminal, which is applied to the access control of the terminal in a handover process of the terminal, the method comprising:
   a source access network element notifying a target access network element of closed subscriber group configuration information of a source cell via a direct interface, between the source access network and the target access network element; and,
   the target access network element determining whether to allow the terminal to access to a target cell based on closed subscriber group configuration information of the target cell and the closed subscriber group configuration information of the source cell.

2. The method according to claim 1, wherein
   the closed subscriber group configuration information includes a closed subscriber group identifier and a closed subscriber group access mode.

3. The method according to claim 2, wherein
   in the step of the target access network element determining whether to allow the terminal to access to the target cell,
   when the access mode of the target cell is a closed access mode, the target access network element allows access of the terminal in the following cases: the source cell is a closed access mode closed subscriber group cell with the same closed subscriber group cell identifier as the target cell; or, the source cell is a hybrid access mode closed subscriber group cell with the same closed subscriber group cell identifier as the target cell and the terminal is a member of the closed subscriber group in the source cell;
   when the target cell is a hybrid access mode closed subscriber group cell, the target access network element allows access of the terminal, and determines membership status of the terminal in the target cell according to the following conditions: the source cell is a closed access mode closed subscriber group cell with the same closed subscriber group identifier as the target cell, and the target access network element accesses to the terminal as a member of the closed subscriber group; or, the source cell is a hybrid closed subscriber group cell with the same closed subscriber group identifier as the target cell, and the membership status of the terminal in the target cell is the same as that in the source cell; or, the source cell is an open access mode cell, or a common macro cell, or a closed access mode closed subscriber group cell with another closed subscriber group identifier, or a hybrid access mode closed subscriber group cell, and the terminal accesses to the target access network as a non-member of the closed subscriber group; and
   when the target cell is an open access mode cell or a common macro cell, the target access network element allows access of the terminal.

4. The method according to claim 1, further comprising:
   in the case that the access mode of the source cell is a hybrid access mode, when the source access network element sends a handover request to the target access network element, notifying the target access network element of information as to whether the terminal is a member of the closed subscriber group in the source cell via a handover process of the direct interface.

5. The method according to claim 1, wherein
   the step of the source access network element notifying the target access network element of the closed subscriber group configuration information of the source cell via the direct interface between the source access network and the target access network element comprises:
   before the source access network element sets up the direct interface with the target access network element, the source access network element and the target access network element acquiring the closed subscriber group configuration information of the cell of the other side based on static configuration information of an operation, maintenance and management network element; or, when the source access network element and the target access network element acquire direct interface information of the opponent, performing interaction of the closed subscriber group configuration information via a transmission address searching process of the direct interface.

6. The method according to claim 1, wherein
   the step of the source access network element notifying the target access network element of the closed subscriber group configuration information of the source cell via the direct interface between the source access network and the target access network element comprises:
   the source access network element sending the closed subscriber group configuration information of the source cell to the target access network element via a set up process of the direct interface.

7. The method according to claim 1, wherein
   the step of the source access network element notifying the target access network element of the closed subscriber group configuration information of the source cell via the direct interface between the source access network and the target access network element comprises:

the source access network element updating the closed subscriber group configuration information of the source cell to the target access network element via a NodeB configuration update process.

8. The method according to claim 1, wherein in a long term evolution system, the source access network element and the target access network element refer to macro eNodeBs, or home eNodeBs or access nodes having eNodeB functions; in a universal mobile telecommunication system, the source access network element and the target access network element refer to radio network controllers, or macro NodeBs, or home NodeBs, or access nodes having NodeB functions.

9. A system for access control of a terminal, which is applied to the access control of the terminal in a handover process of the terminal, the system comprising a source access network element to which the terminal belongs, and a target access network element to which the terminal switches, wherein the source access network element is configured to notify the target access network element of closed subscriber group configuration information of a source cell via a direct interface between the source access network and the target access network element; and the target access network element is configured to determine whether to allow the terminal to access to a target cell based on closed subscriber group configuration information of the target cell and the closed subscriber group configuration information of the source cell.

10. The system according to claim 9, wherein the source access network element is configured to notify the target access network element of the closed subscriber group configuration information of the source cell via the direct interface between the source access network and the target access network element by:

before the source access network element sets up the direct interface with the target access network element, performing interaction of the closed subscriber group configuration information with the target access network element via static configuration information of an operation, maintenance and management network element; or when the source access network element and the target access network element acquire direct interface information of the opponent, performing interaction of the closed subscriber group configuration information with the target access network element via a transmission address searching process of the direct interface; or sending the closed subscriber group configuration information of the source cell to the target access network element via a set up process of the direct interface; or updating the closed subscriber group configuration information of the source cell to the target access network element via a configuration update process of a NodeB.

11. An access equipment applied to access control of a terminal in a handover process of the terminal, the access equipment being configured to, when the access equipment is a source access network element, notify a target access network element of closed subscriber group configuration information of a source cell via a direct interface between the source access network and the target access network element, and when the access equipment is the target access network element, determine whether to allow the terminal to access to a target cell based on closed subscriber group configuration information of the target cell and the closed subscriber group configuration information of the source cell.

12. The access device according to claim 11, wherein the closed subscriber group configuration information includes a closed subscriber group identifier and a closed subscriber group access mode; and when the access equipment is the source access network element, the access equipment is further configured to, in the case that the access mode of the source cell is a hybrid access mode, when a handover request is sent to the target access network element, notify the target access network element of information as to whether the terminal is a member of the closed subscriber group in the source cell via a handover process of the direct interface.

13. The access device according to claim 11, wherein the closed subscriber group configuration information includes a closed subscriber group identifier and a closed subscriber group access mode; and when the access equipment is the target access network element, the access equipment is configured to determine whether to allow the terminal to access to the target cell according to the following approaches:

when the access mode of the target cell is a closed access mode, the target access network element allows access of the terminal in the following cases: the source cell is a closed access mode closed subscriber group cell with the same closed subscriber group cell identifier as the target cell; or, the source cell is a hybrid access mode closed subscriber group cell with the same closed subscriber group cell identifier as the target cell and the terminal is a member of the closed subscriber group in the source cell;

when the target cell is a hybrid access mode closed subscriber group cell, the target access network element allows access of the terminal, and determines membership status of the terminal in the target cell according to the following conditions: the source cell is a closed access mode closed subscriber group cell with the same closed subscriber group identifier as the target cell, and the target access network element accesses to the terminal as a member of the closed subscriber group; or, the source cell is a hybrid closed subscriber group cell with the same closed subscriber group identifier as the target cell, and the membership status of the terminal in the target cell is the same as that in the source cell; or, the source cell is an open access mode cell, or a common macro cell, or a closed access mode closed subscriber group cell with another closed subscriber group identifier, or a hybrid access mode closed subscriber group cell, and the terminal accesses to the target access network as a non-member of the closed subscriber group; and when the target cell is an open access mode cell or a common macro cell, the target access network element allows access of the terminal.

14. The access device according to claim 11, wherein the closed subscriber group configuration information includes a closed subscriber group identifier and a closed subscriber group access mode; and when the access equipment is the source access network element, the access equipment is configured to notify the target access network element of the closed subscriber group configuration information of the source cell via the direct interface between the source access network and the target access network element according to the following approaches:

before the source access network element sets up the direct interface with the target access network element, the source access network element and the target access network element acquire the closed subscriber group configuration information of the cell of the other side based on static configuration information of an operation, maintenance and management network element; or, when the source access network element and the target access network element acquire direct interface information of the opponent, interaction of the closed subscriber group configuration information is performed via a transmission address searching process of the direct interface; or the source access network element sends the closed subscriber group configuration information of the source cell to the target access network element via a set up process of the direct interface; or the source access network element updates the closed subscriber group configuration information of the source cell to the target access network element via a configuration update process of a NodeB.

15. The access device according to claim 11, wherein in a long term evolution system, the access equipment is a macro eNodeB, or home eNodeB or access node having eNodeB functions; in a universal mobile telecommunication system, the access equipment is a radio network controller, or macro NodeB, or home NodeB, or access node having NodeB functions.

* * * * *